United States Patent
Keohane et al.

(10) Patent No.: US 7,991,877 B2
(45) Date of Patent: Aug. 2, 2011

(54) ROGUE ROUTER HUNTER

(75) Inventors: Susann Marie Keohane, Austin, TX (US); Gerald Francis McBrearty, Austin, TX (US); Shawn Patrick Mullen, Buda, TX (US); Jessica Carol Murillo, Round Rock, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 404 days.

(21) Appl. No.: 11/867,726

(22) Filed: Oct. 5, 2007

(65) Prior Publication Data

US 2009/0094357 A1    Apr. 9, 2009

(51) Int. Cl.
*G06F 15/173* (2006.01)
(52) U.S. Cl. ................................... 709/224; 709/225
(58) Field of Classification Search .............. 709/224, 709/225
See application file for complete search history.

(56) References Cited

U.S. PATENT DOCUMENTS

| | | | |
|---|---|---|---|
| 5,835,720 A | 11/1998 | Nelson et al. | |
| 6,978,314 B2 | 12/2005 | Tarr | |
| 7,159,033 B2 | 1/2007 | Etoh | |
| 7,558,265 B2 * | 7/2009 | Andre et al. | 370/392 |
| 2004/0054926 A1 * | 3/2004 | Ocepek et al. | 713/201 |
| 2005/0050365 A1 * | 3/2005 | Seki et al. | 713/201 |
| 2005/0108415 A1 | 5/2005 | Turk et al. | |
| 2005/0172153 A1 * | 8/2005 | Groenendaal | 713/201 |
| 2006/0089994 A1 * | 4/2006 | Hayes | 709/227 |
| 2006/0233179 A1 * | 10/2006 | Estrada et al. | 370/395.54 |
| 2006/0256788 A1 * | 11/2006 | Donahue | 370/389 |
| 2008/0301820 A1 * | 12/2008 | Stevens | 726/28 |

FOREIGN PATENT DOCUMENTS

JP   2005236665   9/2005

* cited by examiner

*Primary Examiner* — Kenny S Lin
*Assistant Examiner* — Shripal K Khajuria
(74) *Attorney, Agent, or Firm* — Yee & Associates, P.C.; Libby Z. Toub

(57) ABSTRACT

A computer implemented method, data processing system, and computer program product for discovering an unauthorized router in a network. The process in the illustrative embodiments first obtains a physical address of a suspected router or destination device. A data packet is created which comprises at least a destination media access control field, a destination internet protocol field, and a time-to-live field, wherein the destination media access control field comprises the physical address of the destination device, wherein the destination internet protocol field comprises a bogus internet protocol address, and wherein the time-to-live field comprises a value indicating the data packet has exceeded a time limit. The data packet is sent to the destination device using the physical address in the destination media access control field. If a time exceeded message is received from the destination device, the destination device is determined to be enabled for routing.

18 Claims, 3 Drawing Sheets

ROGUE ROUTER HUNTER

BACKGROUND OF THE INVENTION

1. Field of the Invention

The present invention relates generally to an improved data processing system, and in particular to a computer implemented method, data processing system, and computer program product for discovering an unauthorized router in a network.

2. Description of the Related Art

Distributed network data processing systems are becoming more and more prevalent in businesses and in homes. Typically, a network data processing system contains a network with a medium used to provide communications links between various devices and computers connected within that network. This medium includes wires providing communications links with other devices, such as a router providing routing of data between the different devices on the network. One protocol used to transmit data within a network is the transmission control protocol/internet protocol (TCP/IP). This protocol is used on the Internet and also may be implemented in other networks, such as an intranet, a local area network (LAN), or a wide area network (WAN). TCP provides transport functions to ensure that the total amount of bytes sent is received correctly at the other end. IP is used to accept packets from TCP and adds a header to deliver the packet to a data link layer protocol. An IP address is used by every client and server in the network to send data between the different systems.

A router is a device that determines the proper path for data to travel between different networks (i.e., separate logical subnets). The router forwards data packets to the next device along this path. A router may create or maintain a table of the available routes and their conditions and use this information to determine the best route for a given packet.

In the world of security, an unauthorized router in an organization's network is known as a rogue router. These unauthorized routers are not monitored, nor are the machines on the router's subnets. Organizations do not want unauthorized routers running on their networks since there are a number of security concerns associated with these routers. A client device in the network may become a rogue router even if the user does not have malicious intent. For example, if the user connects a laptop computer to the client device and uses a modem to access e-mail via the Internet, the modem becomes an unauthorized router. The user's laptop can even serve as a router if the operating system on the laptop includes a router function, and the function is enabled. This scenario creates security problems since the user's laptop comprises a weaker firewall than an authorized router. Consequently, it is desirable for a network security administrator to be able to detect unauthorized routers and cease their operation.

When a packet is sent from one computer to another, it traverses zero or more routers. The sequence of routers that a packet traverses is termed its route, or path. The traversal of one router is called a hop. In the current art, the traceroute utility may be used to detect routers in the network by recording the route through the distributed network between a source machine and a specified destination machine. If the destination machine is active and a monitoring tool in the source machine is in a position to ping the destination machine's IP address, it is possible to detect the router(s) between the source machine and the destination machine. The traceroute command operates by sending a series of packets (using the Internet Control Message Protocol or ICMP) to the target destination machine. A first packet is constructed with a limited Time-To-Live (TTL) value that is designed to be exceeded by the first router that receives the packet for the first hop. For instance, the TTL value in the first packet has a value of 1. When the first router encounters the packet with the TTL value of 1, the first router is obligated to send an ICMP Time Exceeded message (type 11) back to the sending source machine. The sending source machine also sends other packets comprising a Time-To-Live (TTL) value of 2 for the second hop, then a Time-To-Live (TTL) value of 3 for the third hop, etc. Consequently, each router in the path will respond with a type 11 packet between the sending source machine and the destination machine. When the final destination machine responds to a packet, the process stops.

While the traceroute utility may be used for detecting routers in the network, a problem with the traceroute utility is that a network administrator is unable to discover whether a machine is routing if the routed subnet is not known or if the machines on the router's subnet are silent or down. Thus, utilities in the current art such as traceroute only allow for discovering if a machine is a router if the source machine knows the IP addresses of the subnet or the IP addresses of the machines in the subnet.

SUMMARY OF THE INVENTION

The illustrative embodiments provide a computer implemented method, data processing system, and computer program product for discovering an unauthorized router in a network. The process in the illustrative embodiments first obtains a physical address of a suspected router or destination device. A data packet is created which comprises at least a destination media access control field, a destination internet protocol field, and a time-to-live field, wherein the destination media access control field comprises the physical address of the destination device, wherein the destination internet protocol field comprises a bogus internet protocol address, and wherein the time-to-live field comprises a value indicating the data packet has exceeded a time limit. The data packet is sent to the destination device using the physical address in the destination media access control field. If a time exceeded message is received from the destination device, the destination device is determined to be enabled for routing.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
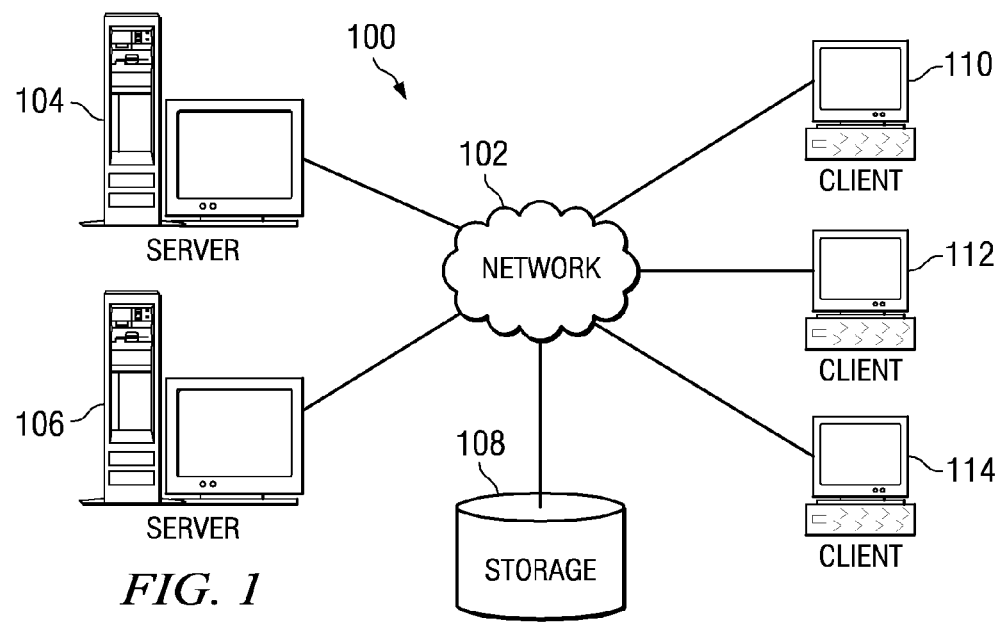
FIG. 1 depicts a pictorial representation of a distributed data processing system in which the illustrative embodiments may be implemented.
Figure 2:
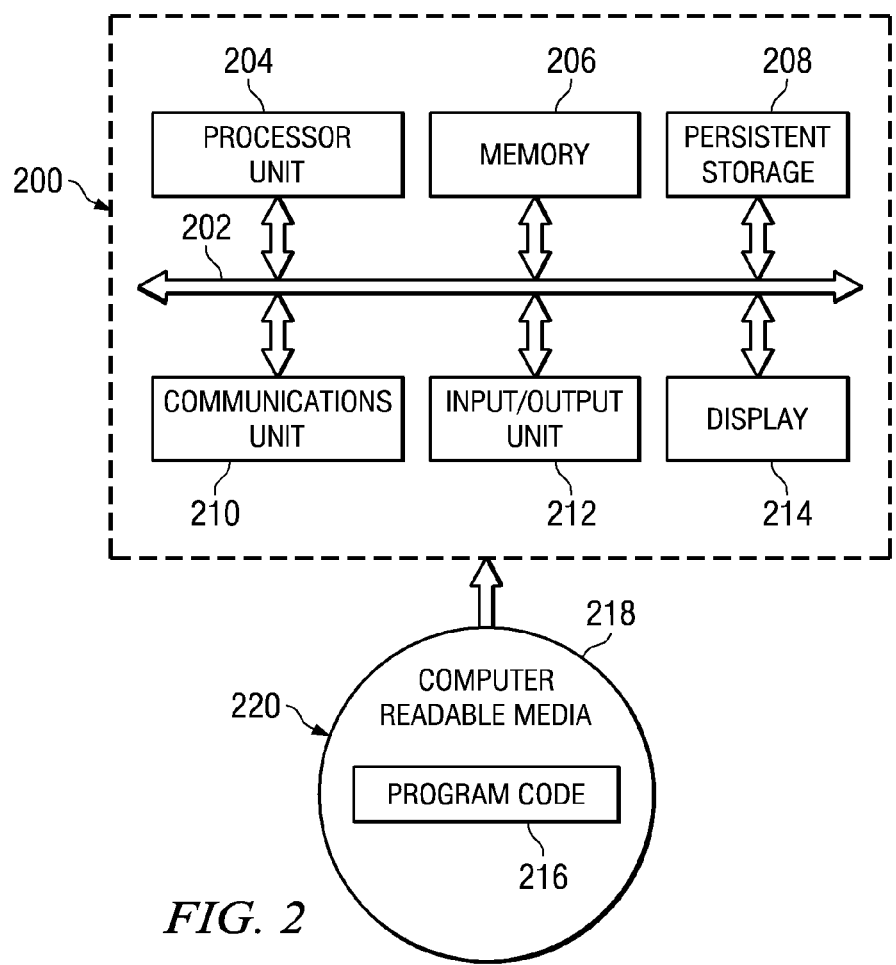
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as, program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive or a flash memory that is connected to data processing system 200.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

For example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
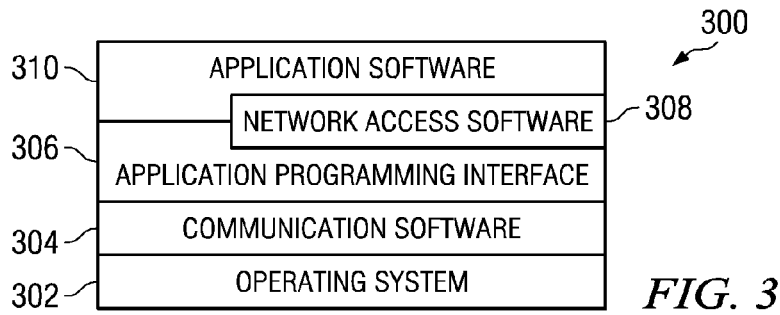
FIG. 3 is a typical software architecture for a data processing system depicted in accordance with a preferred embodiment of the present invention.

Turning to FIG. 3, typical software architecture for a data processing system is depicted in accordance with the illustrative embodiments. This architecture may be implemented in a data processing system, such as data processing system 200 in FIG. 2. At the lowest level in software architecture 300, operating system 302 is utilized to provide high-level functionality to the user and to other software. Such an operating system typically includes a basic input output system (BIOS). Communication software 304 provides communications through an external port to a network such as the Internet via a physical communications link by either directly invoking operating system functionality or indirectly bypassing the operating system to access the hardware for communications over the network.

Application programming interface (API) 306 allows the user of the system, an individual, or a software routine, to invoke system capabilities using a standard consistent interface without concern for how the particular functionality is implemented. Network access software 308 represents any software available for allowing the system to access a network. This access may be to a network, such as a local area network (LAN), wide area network (WAN), or the Internet. With the Internet, this software may include programs, such as Web browsers. Application software 310 represents any number of software applications designed to react to data through the communications port to provide the desired functionality the user seeks. The mechanism of the illustrative embodiments may be implemented within communication software 304 in these examples.

Figure 4:
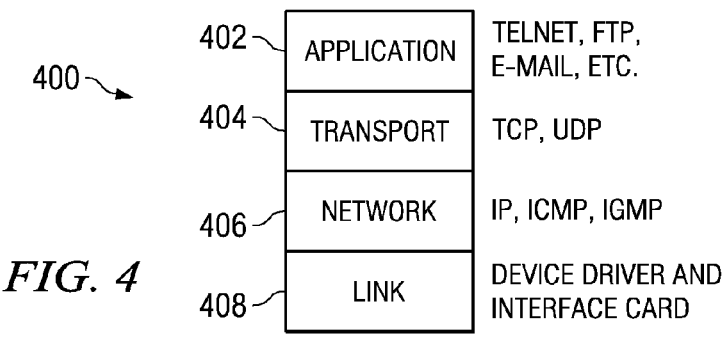
FIG. 4 is a diagram of a Transmission Control Protocol/Internet Protocol (TCP/IP) and similar protocols depicted in accordance with a preferred embodiment of the present invention.

FIG. 4 is a diagram of a Transmission Control Protocol/Internet Protocol (TCP/IP) and similar protocols depicted in accordance with the illustrative embodiments. TCP/IP and similar protocols are utilized by communications architecture 400. In this example, communications architecture 400 is a 4-layer system. This architecture includes application layer 402, transport layer 404, network layer 406, and link layer 408. Each layer is responsible for handling various communications tasks. Link layer 408 also is referred to as the data-link layer or the network interface layer and normally includes the device driver in the operating system and the corresponding network interface card in the computer. This layer handles all the hardware details of physically interfacing with the network media being used, such as optical cables or Ethernet cables.

Network layer 406 also is referred to as the Internet layer and handles the movement of packets of data around the network. For example, network layer 406 handles the routing of various packets of data that are transferred over the network. Network layer 406 in the TCP/IP suite is comprised of several protocols, including Internet Protocol (IP), Internet control message protocol (ICMP), and Internet group management protocol (IGMP).

Next, transport layer 404 provides an interface between network layer 406 and application layer 402 that facilitates the transfer of data between two host computers. Transport layer 404 is concerned with things, such as, for example, dividing the data passed to it from the application into appropriately sized chunks for the network layer below, acknowledging received packets, and setting timeouts to make certain the other end acknowledges packets that are sent. In the TCP/IP protocol suite, two distinctly different transport protocols are present, TCP and user datagram protocol (UDP). TCP provides reliability services to ensure that data is properly transmitted between two hosts, including dropout detection and retransmission services.

Conversely, UDP provides a much simpler service to the application layer by merely sending packets of data called datagrams from one host to the other, without providing any mechanism for guaranteeing that the data is properly transferred. When using UDP, the application layer must perform the reliability functionality.

Application layer 402 handles the details of the particular application. Many common TCP/IP applications are present for almost every implementation, including a Telnet for remote login, a file transfer protocol (FTP), a simple mail transfer protocol (SMTP) for electronic mail, and a simple network management protocol (SNMP). The mechanism of the illustrative embodiments may be implemented as a process within network layer 406.

The illustrative embodiments provide a rogue router hunter system which detects potential security problems by discovering unauthorized routers in the network. An unauthorized router is a machine in which a routing function on the machine is intentionally or unintentionally enabled without being authorized by the network security administrator. In contrast with existing router detection methods such as the traceroute utility, the rogue router hunter system in the illustrative embodiments allows a network security administrator to determine if a machine is an unauthorized router when the IP addresses of the subnet the machine is routing are unknown and when the IP addresses of the machines on the subnet are unknown. This determination may be made even if the machines on the subnet are not powered on or online at the time of the determination.

Figure 5:
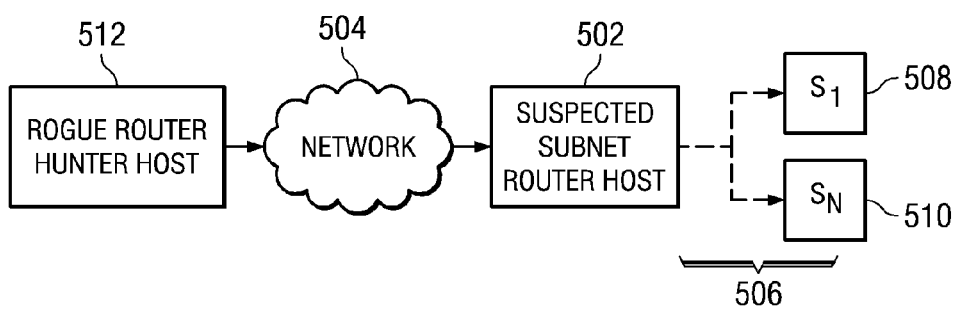
FIG. 5 is a block diagram of a rogue router hunter system for discovering unauthorized routers in accordance with the illustrative embodiments.

FIG. 5 is a block diagram of a rogue router hunter system for discovering unauthorized routers in accordance with the illustrative embodiments. In this example, the unauthorized routing device takes the form of suspected subnet router 502. Suspected subnet router 502 may be a machine having a routing function that is intentionally or unintentionally enabled. Suspected subnet router (SR) 502 contains a network interface card (NIC) in order to access an Ethernet. The network interface card in suspected subnet router 502 accesses the Ethernet using a media access control (MAC) address. A MAC address is a hardware address that uniquely identifies each node of a network. For example, each network interface card has a different MAC address. The MAC address for suspected subnet router 502 is allocated to the network interface card in a manufacturing stage.

Network 504 is an example of a distributed network which provides communications links between various devices and computers, such as network 102 in FIG. 1. Suspected subnet router 502 is implemented to route traffic in network 504. Suspected subnet router 502 may forward data packets on network 504 to subnet 506. In this example, subnet 506 comprises a plurality of machines, such as S1 508 to S11 510.

While conventional systems employ the traceroute utility to determine if a router is down or has failed by sending a packet to the router based on the known IP address of the router, rogue router hunter (RRH) host 512 comprises a program that uses the traceroute utility in a unique way determines whether a device such as suspected subnet router 502 is configured as a router. This determination may be made even though the rogue router hunter program does not know the IP addresses of the subnet of the suspected router or the IP addresses of the machines on the subnet. Rogue router hunter host 512 contains a network interface card having a MAC address to access network 504. Rogue router hunter host 512 may communicate with suspected subnet router 502 via network 504, since rogue router hunter host 512 knows the Ethernet address (MAC address) of suspected subnet router 502. Rogue router hunter 512 may obtain the MAC address of suspected subnet router 502 by using a ping utility which identifies whether a target device is on the network, or using an Address Resolution Protocol to determine a target's hardware address when only the target's IP address is known. Rogue router hunter 512 needs to obtain the MAC address of suspected subnet router 502 because a subnet router will not listen to or process a packet unless the packet contains the subnet router's MAC address in the packet's destination address. The ping utility operates by sending an ICMP request packet to a target device and listens for the reply. The reply packet may comprise the source MAC address, the destination or target MAC address, the source IP address, and the destination IP address. Thus, the program in rogue router hunter host 512 creates a data packet that includes a source MAC address comprising the MAC address for rogue router hunter host 512, and a destination MAC address comprising the MAC address for suspected subnet router 502. This data packet also includes a bogus IP address for suspected subnet router 502 in the destination IP address field of the packet. The rogue router hunter will also set the time-to-live (TTL) value of the packet to 1. Rogue router hunter host 512 then sends the data packet to suspected subnet router 502, and suspected subnet router 502 receives the packet because the destination MAC address in the packet matches the MAC address of the network interface card in suspected subnet router 502.

Suspected subnet router 502 examines the packet header and determines if the destination IP packet is addressed to suspected subnet router 502. If the destination IP packet in the packet does not match the IP address of suspected subnet router 502, suspected subnet router 502 will discard the packet. Thus, if the subnet router is not configured to route, the subnet router checks the destination IP address, determines that the destination IP address is not the subnet router's IP address, and drops the packet. However, if suspected subnet router 502 has its router function enabled, suspected subnet router 502 will not discard the packet. In this router-enabled situation, suspected subnet router 502 eventually will compare the destination IP address in the packet with IP addresses in a routing table to determine the best route for the packet. The subnet router determines that although the destination IP address is not the subnet router's IP address, but since the subnet router is configured to route, the subnet router must send the packet onwards. However, before suspected subnet router 502 performs the comparison, suspected subnet router 502 examines the time-to-live (TTL) field. The TTL field is a hop limit used to indicate a limit on the number of iterations that a packet can experience before the packet should be discarded. If the TTL field is less than or equal to 1, suspected subnet router 502 returns a time exceeded (type 11) packet according to ICMP protocol to the source IP address in the packet, or rogue router hunter host 512. Thus, the subnet router determines it cannot route the packet because TTL value is too low, and the subnet router informs the packet sender of this problem. If rogue router hunter host 512 receives such an ICMP time exceeded message, the rogue router hunter knows that suspected subnet router 502 has its routing function enabled. Rogue router hunter host 512 may alert the network security administrator of the unauthorized router.

In a particular example, suspected subnet router 502 employing the Advanced Interactive eXecutive (AIX™) operating system receives and examines a packet from rogue router hunter host 512. If the destination IP address in the packet does not match the IP address of suspected subnet router 502, and routing is enabled suspected subnet router 502, the packet is passed to an ip_mforward( ) function prior to being passed to the routing table. This ip_mforward( ) function will return a 0 if the TTL in the packet has expired (i.e., TTL $\leq$1), causing suspected subnet router 502 to respond with an ICMP time exceeded (type 11) message. If rogue router hunter host 512 receives such an ICMP time exceeded message from suspected subnet router 502, then rogue router hunter host 512 knows suspected subnet router 502 is enabled for routing.

Figure 6:
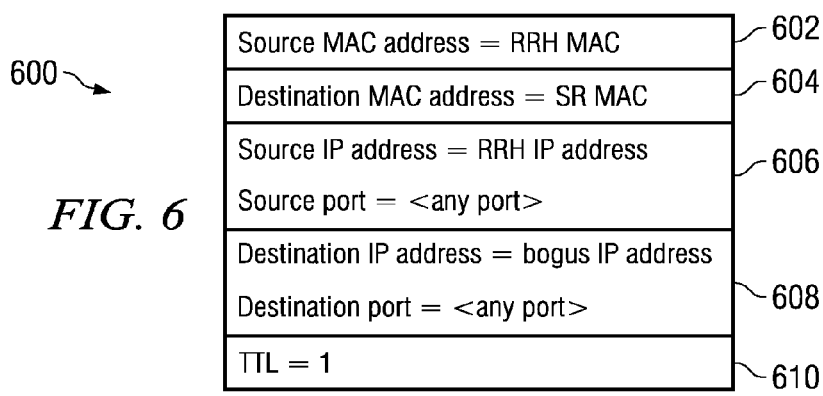
FIG. 6 illustrates a packet created by the rogue router hunter in accordance with the illustrative embodiments.

FIG. 6 illustrates a packet created by the rogue router hunter in accordance with the illustrative embodiments. Packet 600 may be sent from rogue router hunter 512 to determine if a machine such as suspected subnet router 502 in FIG. 5 is routing. Packet 600 comprises various fields, including source MAC address 602, destination MAC address 604, source IP address 606, destination IP address 608, and TTL field 610.

Source MAC address 602 is the MAC address of the device sending the packet, or rogue router hunter host 512 in FIG. 5.

Destination MAC address 604 is the MAC address of the device to receive the packet, or suspected subnet router 502 in FIG. 5. As previously mentioned, in situations where the IP addresses of the suspected routing machine or the machines on the subnet are unknown, a conventional packet comprising a source IP address and a destination IP address cannot be used to determine if the suspected machine is routing. The rogue router hunter addresses this issue by creating packet 600 which allows the rogue router hunter to send the packet to a particular suspected router using the suspected router's MAC address, an address which is known to the rogue router hunter. Thus, when the rogue router hunter sends packet 600 to the suspected router, the suspected router receives the packet because the destination MAC address in the packet matches the MAC address of the suspected router's network interface card.

Source IP address 606 is the IP address of the device sending the packet, or the rogue router hunter. Source IP address 606 is used by the suspected router to return an ICMP time exceeded message to the rogue router hunter if the suspected router is routing.

Destination IP address 608 is a bogus IP address. A correct destination IP address is not used in packet 600 because the rogue router hunter does not know any of the IP addresses of the suspected router or subnet machines. A bogus IP address is placed in destination IP address 608 to allow the suspected router to process packet 600 in a normal manner, and to allow the rogue router hunter to discover if the suspected router is routing, since the bogus IP address in destination IP address 608 will not match the IP address of the suspected router, and thus the suspected router will try, if routing is enabled, to route the packet.

TTL field 610 is a value which specifies the time-to-live value assigned to packet 600. When the rogue router hunter creates packet 600, the rogue router hunter assigns a value of "1" to TTL field 610, since only one hop is required between the rogue router hunter and the suspected router. A value of 1 in the TTL field 610 causes a suspected router to send an ICMP time exceeded message back to the rogue router hunter when the suspected router receives packet 600.

Figure 7:
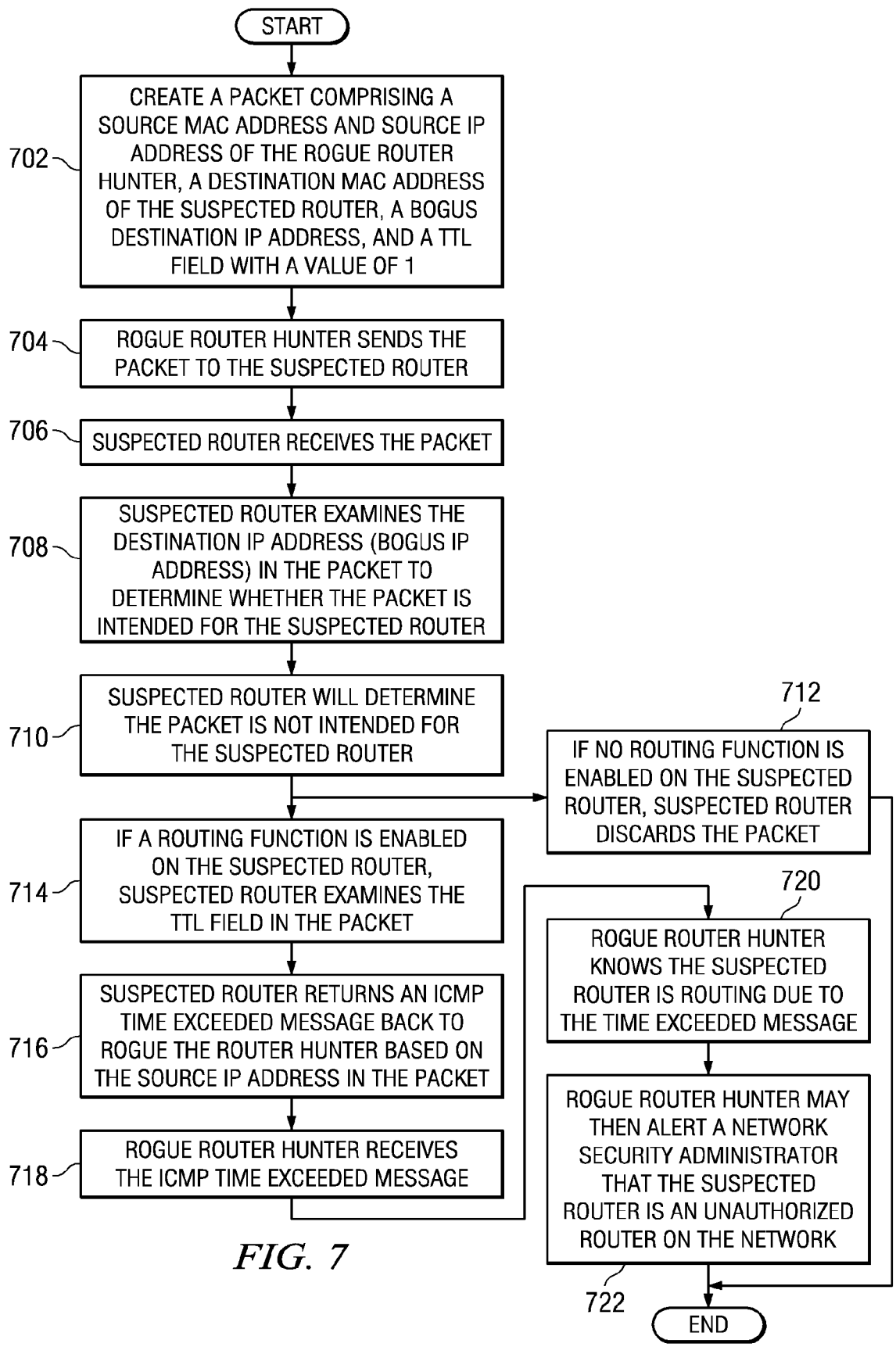
FIG. 7 is a flowchart of a process for discovering unauthorized routers in accordance with the illustrative embodiments.

FIG. 7 is a flowchart of a process for discovering unauthorized routers in accordance with the illustrative embodiments. The process begins when a rogue router hunter program creates a data packet according to packet 600 in FIG. 6 which comprises a source MAC address of the rogue router hunter, a destination MAC address of the suspected router, a source IP address of the rogue router hunter, a bogus destination IP address and a TTL field with a value of 1 (step 702). The rogue router hunter sends the packet to the suspected router (step 704). The suspected router receives the packet (step 706), since the destination MAC address in the packet matches the MAC address of the suspected router's network interface card.

The suspected router then examines the destination IP address (bogus IP address) in the packet to determine whether the packet is intended for the suspected router (step 708). Since the destination IP address in the packet is a bogus address, the destination IP address in the packet will not match the suspected router's IP address. The suspected router will thus determine that the packet is not intended for the suspected router (step 710).

At this point, if there is no routing function enabled on the suspected router, the suspected router discards the packet (step 712), with the process termination thereafter. Since the rogue router hunter never receives an ICMP time exceeded message from the suspected router, the rogue router hunter determines that the suspected router is not routing.

However, if a routing function is enabled on the suspected router, the suspected router examines the TTL field in the packet (step 714). Since the TTL field in the packet created by the rogue router hunter has a value of 1, the suspected router returns an ICMP time exceeded message back to the rogue router hunter (packet sender) based on the source IP address in the packet (step 716). Since the source IP address in the packet is the IP address of the rogue router hunter, the rogue router hunter receives the ICMP time exceeded message (step 718).

When a time exceeded message from the suspected router is received by the rogue router hunter, the rogue router hunter will know that the suspected router is routing (step 720). The rogue router hunter may then alert a network security administrator that the suspected router is an unauthorized router on the network (step 722), with the process terminating thereafter.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for detecting unauthorized routers in a distributed network, the computer implemented method comprising:
    obtaining a physical address of a destination device;
    creating, by a source device, a data packet comprising at least a destination media access control field, a destination internet protocol field, and a time-to-live field, wherein the destination media access control field comprises the physical address of the destination device, wherein the destination internet protocol field comprises a bogus internet protocol address to cause the destination device receiving the data packet to route the data packet if the destination device is configured for routing, and wherein the time-to-live field comprises a value indicating the data packet has already exceeded a time limit to cause the destination device receiving the data packet to return a time exceeded message to the source device;
    sending the data packet to the destination device using the physical address in the destination media access control field; and
    responsive to receiving the time exceeded message from the destination device, determining that the destination device is enabled for routing.

2. The computer implemented method of claim 1, further comprising:
responsive to a failure to receive a time exceeded message from the destination device, determining that the destination device is not enabled for routing.

3. The computer implemented method of claim 1, wherein the physical address of the destination device is the media access control address of a network interface card in the destination device.

4. The computer implemented method of claim 1, wherein the data packet further comprises a source media access control field comprising a physical address of a source device and a source internet protocol field comprising an internet protocol address of the source device.

5. The computer implemented method of claim 1, wherein the destination device examines the destination internet protocol address in the data packet, determines if the destination internet protocol address in the data packet matches the internet protocol address of the destination device, examines the value in the time-to-live field in the data packet if routing is enabled on the destination device, and sends the time exceeded message to the internet protocol address in the source internet protocol address field if the value indicates the data packet has exceeded a time limit.

6. The computer implemented method of claim 5, wherein the destination device discards the data packet if routing is not enabled on the destination device.

7. The computer implemented method of claim 1, wherein the determination that the destination device is enabled for routing is performed when the internet protocol address for the destination device is unknown.

8. The computer implemented method of claim 1, wherein the determination that the destination device is enabled for routing is performed when the internet protocol addresses for devices on a subnet of the destination device are unknown.

9. The computer implemented method of claim 1, wherein the physical address of the destination device is obtained using one of a ping utility or an Address Resolution Protocol.

10. A data processing system for detecting unauthorized routers in a distributed network, the data processing system comprising:
a bus;
a storage device connected to the bus, wherein the storage device contains computer usable code;
at least one managed device connected to the bus;
a communications unit connected to the bus; and
a processing unit connected to the bus, wherein the processing unit executes the computer usable code to obtain a physical address of a destination device; create a data packet comprising at least a destination media access control field, a destination internet protocol field, and a time-to-live field, wherein the destination media access control field comprises the physical address of the destination device, wherein the destination internet protocol field comprises a bogus internet protocol address to cause the destination device receiving the data packet to route the data packet if the destination device is configured for routing, and wherein the time-to-live field comprises a value indicating the data packet has already exceeded a time limit to cause the destination device receiving the data packet to return a time exceeded message to a source device; send the data packet to the destination device using the physical address in the destination media access control field; and determine that the destination device is enabled for routing in response to receiving the time exceeded message from the destination device.

11. A computer program product for detecting unauthorized routers in a distributed network, the computer program product comprising:
a non-transitory computer usable storage medium having computer usable program code stored thereon, the computer usable program code comprising:
computer usable program code for obtaining a physical address of a destination device;
computer usable program code for creating a data packet comprising at least a destination media access control field, a destination internet protocol field, and a time-to-live field, wherein the destination media access control field comprises the physical address of the destination device, wherein the destination internet protocol field comprises a bogus internet protocol address to cause the destination device receiving the data packet to route the data packet if the destination device is configured for routing, and wherein the time-to-live field comprises a value indicating the data packet has already exceeded a time limit to cause the destination device receiving the data packet to return a time exceeded message to a source device;
computer usable program code for sending the data packet to the destination device using the physical address in the destination media access control field; and
computer usable program code for determining that the destination device is enabled for routing in response to receiving the time exceeded message from the destination device.

12. The computer program product of claim 11, further comprising:
computer usable program code for determining that the destination device is not enabled for routing in response to a failure to receive a time exceeded message from the destination device.

13. The computer program product of claim 11, wherein the physical address of the destination device is the media access control address of a network interface card in the destination device.

14. The computer program product of claim 11, wherein the data packet further comprises a source media access control field comprising a physical address of a source device and a source internet protocol field comprising an internet protocol address of the source device.

15. The computer program product of claim 11, wherein the destination device examines the destination internet protocol address in the data packet, determines if the destination internet protocol address in the data packet matches the internet protocol address of the destination device, examines the value in the time-to-live field in the data packet if routing is enabled on the destination device, and sends the time exceeded message to the internet protocol address in the source internet protocol address field if the value indicates the data packet has exceeded a time limit.

16. The computer program product of claim 15, wherein the destination device discards the data packet if routing is not enabled on the destination device.

17. The computer program product of claim 11, wherein the determination that the destination device is enabled for routing is performed when the internet protocol address for the destination device is unknown or when the internet protocol addresses for devices on a subnet of the destination device are unknown.

18. The computer program product of claim 11, wherein the physical address of the destination device is obtained using one of a ping utility or an Address Resolution Protocol.

* * * * *